No. 742,576. PATENTED OCT. 27, 1903.
J. W. BRONAUGH, Jr.
LATHE ATTACHMENT.
APPLICATION FILED NOV. 26, 1902.
NO MODEL. 3 SHEETS—SHEET 1.
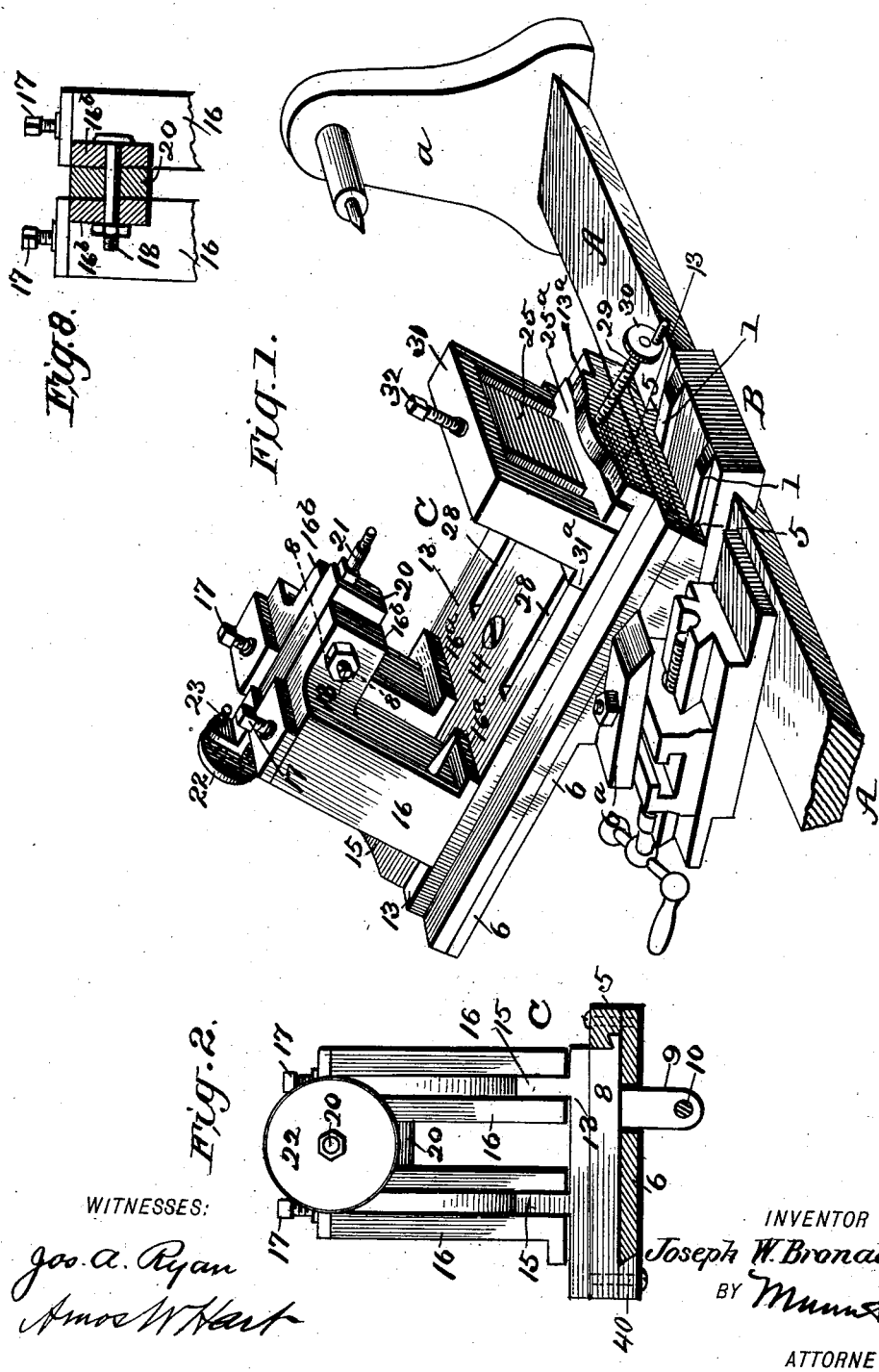
WITNESSES:
Jos. A. Ryan
Amos W Hart
INVENTOR
Joseph W. Bronaugh Jr.
BY Munn & Co.
ATTORNEYS.

No. 742,576. PATENTED OCT. 27, 1903.
J. W. BRONAUGH, Jr.
LATHE ATTACHMENT.
APPLICATION FILED NOV. 26, 1902.
NO MODEL. 3 SHEETS—SHEET 2.

WITNESSES:
Jos. A. Ryan
Amos W. Hart

INVENTOR
Joseph W. Bronaugh Jr.
BY Munn & Co.
ATTORNEYS.

No. 742,576. PATENTED OCT. 27, 1903.
J. W. BRONAUGH, Jr.
LATHE ATTACHMENT.
APPLICATION FILED NOV. 26, 1902.
NO MODEL. 3 SHEETS—SHEET 3.
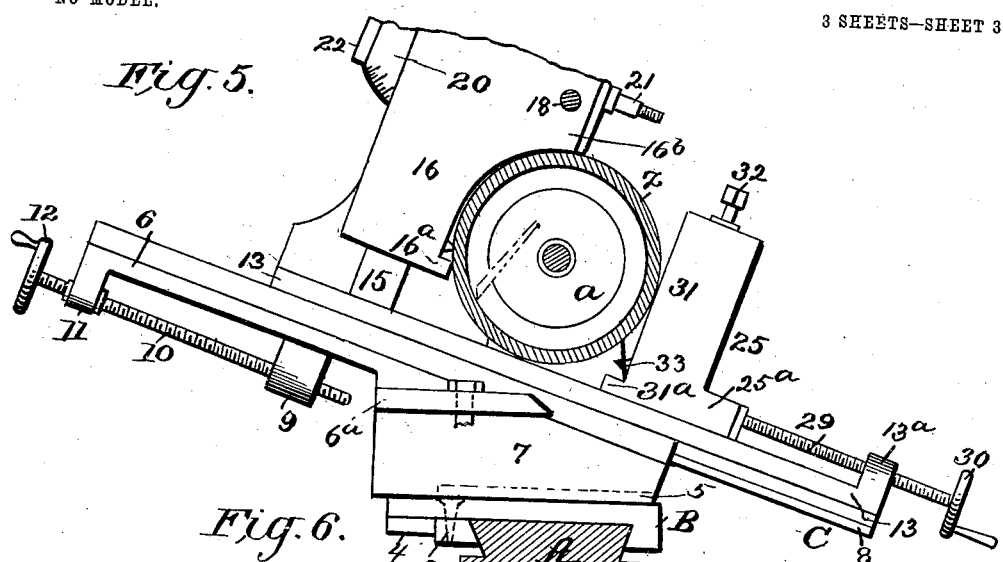
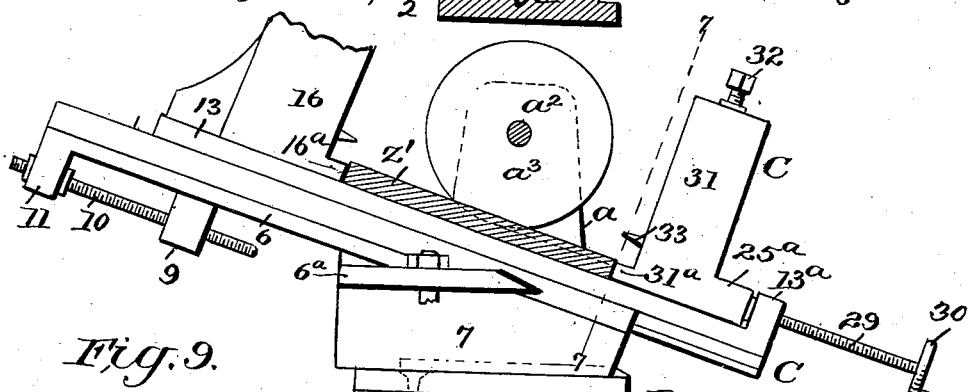
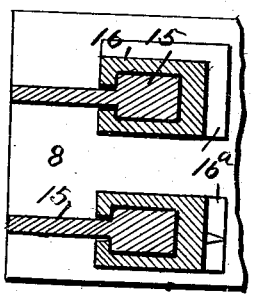
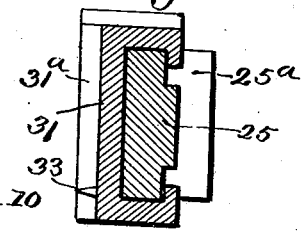
WITNESSES:
Jos. A. Ryan
Amos H. Hart
INVENTOR
Joseph W. Bronaugh Jr.
BY Munn & Co.
ATTORNEYS.

No. 742,576.

Patented October 27, 1903.

UNITED STATES PATENT OFFICE.

JOSEPH WILLIAM BRONAUGH, JR., OF MANCHESTER, VIRGINIA.

LATHE ATTACHMENT.

SPECIFICATION forming part of Letters Patent No. 742,576, dated October 27, 1903.

Application filed November 26, 1902. Serial No. 132,883. (No model.)

*To all whom it may concern:*

Be it known that I, JOSEPH WILLIAM BRONAUGH, Jr., a citizen of the United States, residing at Manchester, in the county of Chesterfield and State of Virginia, have made certain new and useful Improvements in Lathe Attachments, of which the following is a specification.

My invention consists of a slidable or movable attachment for lathes, the same being adapted for cylinder-boring, for cutting spur and bevel gears, and milling cutters, also fluting taps or reamers, and also for side milling, cutting T or V or other slots and grooves, also sawing and slotting tubes and plates and drilling the same, &c. The attachment may be applied to any ordinary lathe and is adapted to be adjusted lengthwise and also transversely of the same. The longitudinal adjustment is effected by the ordinary feed-screw of the lathe or by its hand-ratchet, and this may be done automatically or by hand, according to circumstances. The transverse adjustment of the attachment proper is effected by the cross feed-screw of the lathe-carriage.

The principle feature of the attachment is its inclination transversely of the lathe-bed.

The details of construction, arrangement, and combination of parts are as hereinafter described, reference being had to the accompanying drawings, in which—

Figure 3:
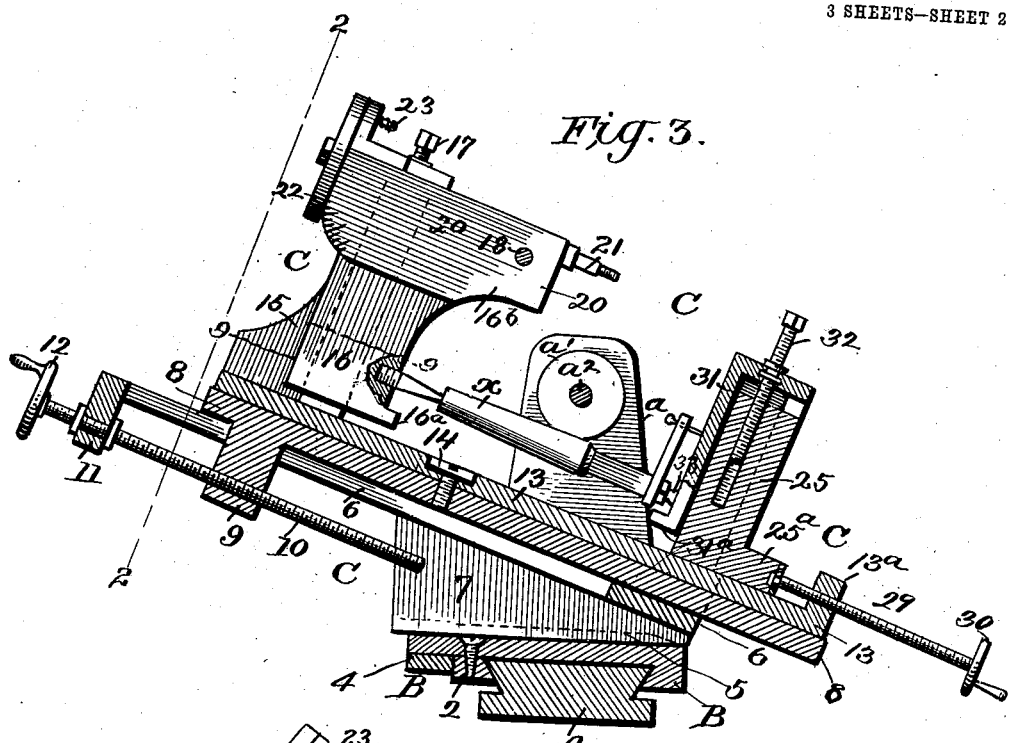
Figure 4:
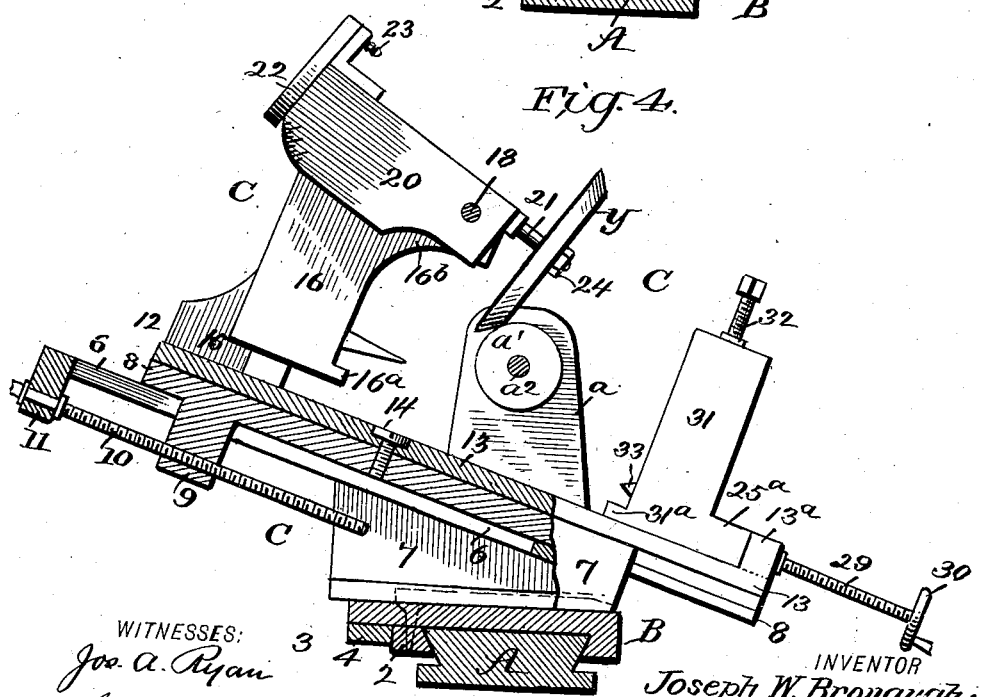

Figure 1 is a perspective view illustrating my improvement applied to a lathe-bed. Fig. 2 is a transverse section on the line 2 2 of Fig. 3. Fig. 3 is practically a central longitudinal section of the lathe attachment, the lathe-bed being shown in transverse section and the attachment being adjusted for fluting a tap or reamer. Fig. 4 is mainly a longitudinal section of the attachment, part being shown in side view and the attachment being adjusted for cutting a gear or ratchet wheel. Fig. 5 is mainly a side view of the attachment, the same being duly adjusted for clamping a cylinder in position to be bored by a tool forming an attachment of the lathe proper. Fig. 6 is a side view of the attachment with parts adjusted for holding a plate while being slotted by a cutter attached to the lathe proper. Fig. 7 is a transverse section on the line 7 7 of Fig. 6. Fig. 8 is a cross-section on the line 8 8 of Fig. 1. Fig. 9 is a cross-section on the line 9 9 of Fig. 3. Fig. 10 is a transverse section on the line 10 10 of Fig. 7.

In Fig. 1 and several other figures, A indicates the bed of a lathe, which may be constructed in the usual way and provided with head and tail stocks having centers on which a mandrel or other tools may be held.

In Figs. 1, 3, 4, 5, 6, *a* indicates a head-stock, no tail-stock being shown. Upon the lathe-bed A is mounted a base-slide B, the same consisting of a thick metal plate, which is detachably secured to the lathe-bed and provided on its upper side with two undercut or dovetail ribs 1. (See Figs. 1 and 7.) To adapt said base-plate B for convenient attachment and detachment, it is provided on one side with a fixed claw and on the other with a removable one 2, the same being shown in Figs. 5 and 6. The claw or bar 2 is held detachably by means of a suitable fastening 3, located behind a pendent flange 4, forming an integral or rigid portion of the base-plate B. It will be understood that the base-plate B will in any case be adapted to the particular lathe on which my attachment is used, and some variation of construction will be necessary in some cases. For instance, in the case of a lathe whose carriage has extensions from its base along the top of the ways of the lathe the base-plate may be secured to such extensions, or the said extensions may be made to serve as the base-plate and the cross-slides formed upon them.

My improved attachment C is applied on the upper side of the base-plate B and adapted to slide thereon transversely of the lathe-bed, the requisite attachment being formed by means of dovetails which engage the ribs 1 of base-plate B, as shown at 5, Fig. 1. Thus the entire attachment C may be readily slid on or off the base-plate B, as the conditions of work require. The entire attachment C is so connected with the ordinary lathe-carriage that it may be moved longitudinally of the lathe-bed A along with the lathe-carriage by means of the lathe feed-screw or hand-ratchet.

The attachment of the part C to the lathe-carriage (shown in Fig. 1) may be conveniently effected by means of a bolt whose head enters the T-slot in the slide and passes up through the lug 6ª of the attachment and is provided with a nut on top. The lug 6ª is on the pendent side 7 of the attachment, and the shape and position of this lug may be varied to suit different carriages.

The main frame or foundation-plate 6 of my attachment C is set at any desired inclination to the horizontal, and the degree of inclination is made to suit the circumstances of the particular lathe and carriage used. This inclination of the said plate 6 is the pivotal idea of my invention, for by it I am enabled to obtain readily nice and exact vertical adjustment of any work placed upon the slide 8 and top plate 13 or to vary the height of the table from the axis of the lathe-spindle to accommodate thicker or thinner work simply by feeding the attachment C across the lathe by the cross feed-screw of the lathe-carriage, the line of the table under the lathe-spindle axis rising higher and higher as the attachment is fed across or lowering as the same is drawn back. When the desired height is attained, the attachment C is clamped in that position by any suitable clamping device—as, for instance, by the tightening of one of the gib-screws of the lathe cross-slide or of the slide on the bottom of the foundation-plate, depending side 7, or both. Then the slide 8, hereinafter fully described, by means of its feed-screw 10 can be made to carry the work along against the tool on the lathe arbor or mandrel, as it were, in a horizontal line with reference to plate 6, thus making a cut in the work of the same depth the whole length of its feed. This inclination of the foundation-plate 6 also gives an additional means for the vertical adjustment of work held between the centers on the sleeves 16 and 31 or on the holder 21, for while the sleeves can be adjusted vertically by means of the screws in their tops it will be convenient to get an approximate vertical adjustment only by means of them and then to get the more exact vertical adjustment by the transverse adjustment of the inclined foundation-plate. Such adaptation for adjustment also adds to the capacity of the machine in the case of large pieces, especially in cutting very large gears, since to the whole height attainable by vertical adjustment of the aforesaid sleeve may be added that obtained by the transverse adjustment of the inclined plate, and should it be desired to cut a gear or similar device smaller than the lowest height the sleeve adjustment will allow by drawing back the inclined plate the end of the holder 21 is brought nearer and nearer vertically to the horizontal plane of the axis of the lathe-spindle. It is to be understood that in adjusting the plate 6 transversely it will be necessary to adjust the slide 8 at the same time by its screw 10 in the opposite direction to that of the plate 6 in order to keep the proper point of the work under the axis of the lathe-spindle.

It will be seen upon careful inspection that the function of the inclination feature of the foundation-plate 6 is that of vertical adjustment, the whole vertical adjustment for all work, except that held between the centers in the sleeves and on the holder 21, being obtained by it and that by its means, in conjunction with the other features of the machine, I am enabled to perform upon a simple lathe by aid of my attachment nearly all the various kinds of work (within its limit of capacity as to size) that are done upon the separate special milling and boring machines and others of like nature. The foundation-plate 6 is provided with pendent side portions 7, (see Figs. 1, 3, 2, 5, 7,) having the aforesaid dovetails 5, Fig. 1. Upon this foundation-plate 6 are mounted the movable parts constituting the remainder of the attachment C. A plate 8, resting upon the foundation-plate 6, is adapted to slide longitudinally on the foundation-plate 6, as follows: The plate 8 is dovetailed on its right-hand upper edge (see Fig. 2) and is extended to the left on plate 6 a sufficient distance to allow the dovetailed side bar 5 to be bolted to the top of the foundation-plate 6 and engage the dovetail of plate 8. The plate 6 is beveled on its left side, and a beveled side bar 40 is bolted on the under left side of plate 8 in such a manner as to engage the same, thus forming longitudinal sliding guides between the plates 6 and 8. This attachment may of course be varied within the discretion of the lathe constructor. As shown in several figures, (see especially 3 and 4,) the plate 8 is provided with a pendent lug 9, through which passes an adjusting-screw shaft 10, the same being swiveled in a pendent flange or lug 11, fixed on the outer end of the foundation-plate 6. The said shaft 10 is furnished with a hand-wheel 12 for use in rotating it as required to adjust—*i. e.*, slide—the plate 8 on the foundation-plate 6. As indicated in Figs. 3 and 4, the said plate 6 is necessarily provided with a lengthwise slot adapted to receive the pendent lug 9 and allow the same to slide longitudinally of the plate 6.

Upon the before-described slidable plate 8 is mounted a top plate 13, the same being shown in several figures. The said top plate 13 always moves with the intermediate slide 8, but is pivoted thereto by means of a screw 14, passing through its center, so that it may be turned at different angles to accommodate different kinds of work. In most operations for which my lathe attachment is adapted the top plate 13 will, however, be held with its side edges parallel to the same planes of the side edges of the intermediate and foundation plates 8 and 6. Near the upper end of the top plate 13 are fixed two posts 15. (See Figs. 3, 4, 9.) These posts are provided with webs or flanges extending rearward for the purpose of strengthening and bracing them. Upon the said posts are mounted vertically-slidable sleeves 16, the same being adapted for vertical adjustment by means of set-screws 17, (see Figs. 1 and 3,) which are swiveled on the tops of the sleeves 16 and enter screw-sockets formed longitudinally in the posts 15. The said sleeves 16 are provided on the under side with base-flanges 16ª and at the top with longer flanges or arms 16ᵇ. (See especially Fig. 1.) A screw-bolt 18 passes through the arms 16ᵇ, and nuts are applied thereto for the purpose of clamping the arms upon the intermediate shaft-carrier 20. The latter is a wide bar (see Figs. 1 and 8) having parallel sides which rest flat in contact with the inner sides of the sleeves 16 and their arms 16ᵇ. The said carrier 20 is bored longitudinally to adapt it to receive a rotary shaft 21, (see Figs. 1 and 8, as before,) upon whose outer side is fixed an index disk or wheel 22, the same being provided on its inner side with annular rows of holes adapted to receive a locking spring-pin 23. The inner or lower end of the shaft 21 is collared, key-seated, reduced, and screw-threaded to adapt it for attachment of a blank y for a gear or cutter of some form and for the application of a screw-nut 24. (See Fig. 4.) Upon the lower portion of the top plate 13 is arranged a post 25, (see Figs. 3 and 10,) the same having dovetail or T feet 26, (see Fig. 7,) which are adapted to slide in corresponding grooves 28, formed in the top plate 13. (See Fig. 1.) The base of the said post 25 is provided with a downward extension 25ª, (see Figs. 1 and 3,) to which is swiveled an adjusting screw-shaft 29, that passes through an upwardly-projecting lug 13ª, forming a rigid attachment of the top plate 13. The said shaft 29 is provided with a hand-wheel 30 for rotating it, and thereby moving the post 25 toward or from the posts 15 and their sleeves 16, as may be required for clamping different kinds of work. Upon this post 25 is mounted a sleeve 31, (see Figs. 1, 3, 4,) the same being adjusted vertically by means of a screw 32, which is swiveled in the top of the sleeve and works in a threaded socket formed longitudinally in the post 25. The sleeve 31 is provided on its front and lateral sides with a base-flange 31ª and at a slightly-higher point with a detachable center 33. It will be seen that the posts 15 and 25 and their vertically-adjustable sleeves 16 and 31 constitute permanent attachments of the top plate 13 and that the lower post 25, with its sleeve 31, may be adjusted toward or from the others, as conditions require; also, that the shaft-carrier 20 may be adjusted at different vertical angles, together with the shaft 21; also, that both sleeves 16 and 31 may be adjusted higher or lower to accommodate different kinds of work.

In Fig. 3 I illustrate the application of my invention for use in grooving a tapered tap or reamer $x$. The same is shown centered upon the centers or projections of the sleeves 16 and 31, and a milling-disk fluting-cutter $a'$, duly keyed upon the mandrel $a^2$, which is supported between the centers of the headstock and tail-stock of the lathe, is arranged for engagement with the tap. It will be seen that the sleeves 16 and 31 are duly adjusted for holding the tap or reamer $x$ with its upper side parallel to the top plate 13, so that the cutter $a'$ may cut grooves of equal depth throughout its length. It will be understood that for the purpose of bringing the tap $x$ into due position to be fluted the whole attachment C is adjusted along the lathe-bed by the hand-ratchet of the lathe-carriage until the tap is brought properly under the cutter $a'$. Then it will be necessary to bring one end of the tap under the center of the cutter by adjusting the plate 8 back or forth by means of the screw 10, and when this is accomplished the foundation-plate 6 is adjusted longitudinally in one direction or the other across the lathe-bed by the feed-screw of the cross-slide of the carriage until by reason of the inclination of the plate the tap is raised or lowered to the right height or position to secure the depth of cut desired, and while this adjustment is being made it will be necessary to continue rotating the screw 10 in the opposite direction to that of the cross slide-screw in order to keep the end of the tap in the right position under the center of the cutter. Then the attachment C is clamped to the lathe-bed by the bolt in the adjustable claw of the base-plate or any other suitable device which may be employed, and the foundation-plate 6 is also clamped in position either by tightening a gib-screw of the cross-slide of the lathe-carriage or of the slide 5 on the base-plate. The plate 8 and the top plate 13, carrying the tap, are then adjusted along the foundation-plate 6 by the screw 10 until the whole length of the tap is fluted by the revolving cutter $a'$, when the screw 10 is rotated in the reverse direction until the same end of the tap as at first is brought under the center of the cutter again, whereupon the spring-pin in the dog holding the tap in position is withdrawn and the tap rotated by the dog the desired distance, when the spring-pin is allowed to engage another hole in the sleeve 31, thus securing the tap in the new position. The next groove is then cut as before. It will be understood that the dog for holding work of this character is a flat bar having in one end the usual hole and clamp-screw for clamping the work and in the other end a spring-pin which is slidable in a longitudinal groove or slot for adjustment to the several annular rows of holes in the sleeve 31 around the center 33.

In order to cut teeth on a blank Y (see Fig. 4) to form a spur or bevel gear or ratchet wheel, as the case may be, the blank Y is duly secured upon the shaft 21 and the sleeves 16 are adjusted to the proper height and the shaft-carrier 20 is adjusted at the due inclination and then clamped between the arms 16ᵇ and the sleeves by means of the transverse bolt 18 and its nut. Then the parts having been adjusted as shown in Fig. 4, by means similar to those described for fluting a tap, with the edge of the blank Y approximated to the edge of the rotary cutter $a'$, the screw-shaft 10 is rotated to feed the slide 8 and top plate 13, with attachments of the latter, in a direction of the arrow, so that the cutter $a'$ traverses the edge of the disk Y and cuts a groove therein as required. Then the slide 8, with top plate 13, is drawn back to the original position and the index-wheel 22 is rotated the distance required to bring the blank Y into due relation to the cutter $a'$ for the purpose of cutting another groove in the blank. The index-wheel 22 may be provided with a handle for convenience of adjustment, and the spring-pin 23 is conveniently operated for releasing and locking the wheel, as will be readily understood. Then by rotating the screw-shaft 10 the operation is repeated and another notch is formed, and thereby a tooth. So the operation goes on until the entire periphery of the blank Y has been duly grooved and toothed.

For the purpose of indicating the degree of inclination of the shaft-carrier 20 it is provided with a graduated arc, as shown at Fig. 4—that is to say, the said arc is formed on the upper lower portion of the shaft-carrier—and as the latter is adjusted the graduations are observed relative to the adjacent side of one of the sleeves 16. The index-wheel 22 will in practice be provided with as many annular rows of holes as necessary, one row for each different size of tooth which it is desired to cut. The spring-pin 23 may be adapted for engagement with a hole in any row.

In Fig. 5 is shown my attachment duly adjusted for boring a cylinder $z$. The sleeves 16 are adjusted vertically until the cylinder can be placed under the arms $16^b$. The cylinder $z$ is then laid on the plate 13 with its side against the inner faces of the said sleeves 16, as shown in Fig. 5. The line of said faces being parallel to the axis of the lathe, the cylinder $z$ is at once adjusted parallel with the axis of the lathe. Then the arms $16^b$ are brought down upon the cylinder by their adjusting-screws 17, Fig. 1, thus clamping it vertically. Next the lower post 25, with its sleeve 31, is adjusted toward the posts 15 and sleeves 16, so as to clamp the cylinder tightly from that direction. To bring the cylinder Z into concentric relation to the boring-bar (which may be of any approved form) carried between the centers of the lathe, the cross feed-screw of the lathe-carriage and the feed-screw of the slide 8 are operated in reverse directions, the one adjusting vertically by reason of the inclined plate and the other horizontally until the center of the cylinder coincides with the axis of the lathe-spindle. The cross-slide of the carriage and slide 8 are then clamped by any suitable means—as, for instance, the tightening of a gib-screw of each—and the boring is then proceeded with in the usual way, either by feeding the whole attachment, carrying the cylinder along the lathe by the longitudinal feed-screw of the lathe, or feeding the reaming or cutting tool through the cylinder, according to the nature of the boring-bar used.

In Fig. 6 I illustrate the attachment duly adjusted for clamping a plate $z'$ which requires to be beveled or slotted or face-milled. The plate $z'$ is held between the base-flanges $16^a$ and $31^a$, forming attachments on the sleeves 16 and 31, respectively. Then the slide 8, with top plate 13, being duly adjusted by feeding the entire attachment C across the base B by means of the cross feed-screw of lathe-carriage till desired depth of cut is obtained, one end of the plate being kept under the center of cutter by rotation of screw 10, the lower edge of the blank $z'$ is brought into contact with a rotary cutter $a^3$ on a mandrel $a^2$, forming the attachment of the lathe, and the feed-screw 10 being duly rotated the plate $z'$ is fed downward, so that a groove is cut the entire length of the plate. In this instance the plate is of such dimensions as to be held between the sleeves 16 and 31; but it is apparent that plates of larger size which do not admit of being secured in this manner may be placed with one of their edges beneath the base portions of the sleeves 16 and 31 to the left and outside of the posts, the same being adjusted upward on their respective posts as required and then brought down and clamped upon the plate, which will in such case extend laterally toward the headstock of the lathe. In case it is desired to form T-slots in a plate, the latter is set up on edge with back to outside of posts and clamped and then operated upon by a T-slot cutter on lathe-spindle.

For sawing and slitting or cutting plain or V grooves and for milling the work can be clamped either on the inside or to the left of the posts 15 and 25 and fed as desired. When clamped on the outside of the posts, the tool can be held in the end of an arbor held in the lathe-spindle socket or screwed on the spindle, thus allowing a feed of the whole of the table, and after one cut has been made the work can be slid up, guided by the posts, reclamped, and other cuts may be made, so that any length of cut may be produced. I have before referred to the fact that the top plate 13 is swiveled or pivoted by a screw 14 to the adjusting-slide or intermediate plate 8. This construction and attachment of parts enables the top plate 13 to be turned on the pivoting-screw 14, so that various angular cuts may be formed in a blank.

The top plate 13, with all its attachments, may be entirely removed by simply removing the screw 14, thus leaving the slide 8 entirely free with its plain upper surfaces exposed. The said slide 8 may be then conveniently employed for holding various kinds of work, particularly plates, by providing it with side attachments adapted for clamping the work, or a separate slide may be thus provided with side clamps and substituted for the one here shown and described. The intermediate plate 8, upon which the top plate 13 is swiveled, may be longitudinally and transversely T-slotted for the purpose of clamping work or a vise thereon.

It is apparent that the depth of any slot or cut can be varied and the plates raised or lowered for holding thinner or thicker work by simply feeding the attachment C back and forth across the lathe by means of cross feed-screw of lathe-carriage and that by means of the longitudinal and cross feed-screws of lathe-carriage and the feed-screw of plate 8 universal adjustment vertically, horizontally, and longitudinally is obtained.

Having thus described my invention, what I claim as new, and desire to secure by Letters Patent, is—

1. The combination, with a lathe-bed, of an attachment comprising a base-plate adapted to slide on said bed, a foundation-plate arranged on said base-plate transversely to the lathe-bed, and at an inclination transverse to the lathe-bed, the same being also slidable transversely to the lathe-bed on the said base-plate, a slide mounted on the said foundation-plate and adapted to move lengthwise thereon, a feed-screw for adjusting such slide, and devices for holding work, the same being connected with the slide, substantially as shown and described.

2. The combination, with a lathe-bed, of an attachment comprising a base-plate adapted to slide lengthwise of said bed, a foundation-plate arranged transversely on said base-plate and at an inclination transversely to the lathe-bed, mounted slidably transversely on the aforesaid base-plate, a sliding plate mounted on the foundation-plate, a screw for adjusting the same on the latter, a top plate mounted pivotally upon the slide and provided with means for clamping work thereon, substantially as shown and described.

3. The combination, with a lathe-bed, of an attachment comprising a base-plate adapted to slide thereon, a foundation-plate arranged at an angle to the horizontal transversely of the lathe-bed, and having pendent portions with a sliding dovetail connection with the base-plate, a slide having a pendent lug projecting through and working in a longitudinal slot of the foundation-plate, a screw-shaft working through said lug and having a swiveled connection with a pendent flange of the foundation-plate, a top plate secured upon the foundation-plate and adapted to be adjusted lengthwise therewith across the lathe-bed, guides or posts fixed on the top plate, sleeves adapted to slide on said posts, and screws for adjusting the sleeves higher or lower as required for holding different kinds of work, substantially as described.

4. In a lathe attachment of the class described, the combination with the lathe-bed, of a base-plate adapted to slide thereon and provided with transverse guide-ribs, a foundation-plate arranged at an angle to the horizontal and adapted to engage with a slide upon the aforesaid ribs, and provided with a lateral projection with suitable attachment for connecting the same with the carriage of the lathe, a slide which is mounted on said foundation-plate and adapted for adjustment lengthwise of the latter, means for effecting such adjustment, and a top plate secured to such slide and having vertical posts, one set being fixed in position and the other adjustable toward or from it; means for adjusting and guiding the movable post; sleeves which are vertically adjustable upon the said posts, and screw-shafts passing through the tops of the sleeves and working in threaded sockets in the posts; substantially as shown and described.

5. The combination with the lathe-bed of the lathe attachment having a foundation-plate arranged at an inclination transverse to the lathe-bed, a plate which is slidable endwise on said foundation-plate transversely to the lathe-bed, a post forming a fixed attachment of such slidable plate, and another post which is movable toward and from such fixed post, a sleeve which is slidable vertically on one of the posts, and means for effectively adjusting said sleeve and the movable post to adapt them for clamping work, substantially as shown and described.

6. The combination with the foundation-plate, arranged at an angle to the horizontal crosswise of the lathe-bed, and adapted for adjustment as specified, of a slide and a screw-shaft for adjusting it on the said foundation-plate, a top plate provided with lengthwise slots and secured upon the foundation-plate, a post which is movable lengthwise of the top plate, and means for adjusting it, a vertically-adjustable sleeve mounted on said post, and means for adjusting it, and a fixed post arranged opposite the movable post for the purpose of clamping work, substantially as shown and described.

7. In a lathe attachment of the class specified, the combination with a base-plate adapted for adjustment on the lathe-bed, of a foundation plate which is arranged at an angle to the horizontal and adapted for lengthwise adjustment transversely of the lathe-bed, a top-plate secured to the foundation-plate, posts fixed on the top plate, sleeves mounted on said posts and provided with forwardly-projecting arms, and means for adjusting the sleeves vertically substantially as shown and described.

8. The combination with the foundation-plate arranged at an angle and adapted for adjustment crosswise of the lathe, of fixed posts and a sleeve adapted for vertical adjustment thereon and provided with a center for holding work, and a movable jaw mounted on the top plate and provided with a screw and having also a center adapted for holding work, and means for adjusting the movable jaw toward or from the fixed one, substantially as shown and described.

9. The combination with a foundation-plate and the top plate secured thereto, and adapted for lengthwise adjustment thereon, and provided with vertical posts arranged side by side, of sleeves which are adjustable on the respective posts and provided with forwardly-projecting arms, a shaft-holder arranged between the said sleeves, a clamping-screw passing through the arms and shaft-holder, a shaft having its bearings in the said holder, and means for rotating and locking the same, substantially as shown and described.

10. The combination with a lathe-bed and a slotted foundation-plate which is arranged at an inclination and also mounted slidably transversely to said lathe-bed, of a slide having a pendent lug which is guided in a lengthwise slot of said foundation-plate, a screw-shaft for adjusting the slide on said foundation-plate, a top plate which is secured upon the slide, and fixed and movable posts arranged on such top plate and adapted for clamping work between them, substantially as shown and described.

11. The combination with the foundation-plate inclined as specified, and a slide mounted thereon, of a top plate having fixed and movable posts, and vertically-adjustable sleeves mounted on said posts and provided with base-flanges on their sides, substantially as and for the purposes specified.

12. The combination with the foundation-plate arranged at an angle and a top plate arranged thereon, and having fixed and movable posts and means for adjusting the movable post, of sleeves mounted on said posts and adapted for vertical adjustment thereon, and provided on their inner opposite sides with points or centers for holding the work, substantially as shown and described.

13. The combination with a lathe-bed and a base-plate which is slidable between the lathe-centers, of the foundation-plate which is inclined and also slidably-mounted transversely to said lathe-bed, a slide mounted on the foundation-plate and slidable endwise thereon transversely to the lathe-bed, and a feed-screw for adjusting the slide, as shown and described.

JOSEPH WILLIAM BRONAUGH, Jr.

Witnesses:
 WM. I. CLOPTON,
 H. K. REID.